US009592656B1

(12) United States Patent
Davies et al.

(10) Patent No.: US 9,592,656 B1
(45) Date of Patent: Mar. 14, 2017

(54) TAMPER EVIDENT SEAL WITH VISIBLE ADHESIVE DOT PATTERN

(71) Applicant: Winfield Laboratories, Inc., Richardson, TX (US)

(72) Inventors: Richard B. Davies, Sandy, UT (US); Christopher A. Davies, Sandy, UT (US)

(73) Assignee: Winfield Laboratories, Inc., Richardson, TX (US)

( * ) Notice: Subject to any disclaimer, the term of this patent is extended or adjusted under 35 U.S.C. 154(b) by 173 days.

(21) Appl. No.: 13/656,390

(22) Filed: Oct. 19, 2012

Related U.S. Application Data

(63) Continuation-in-part of application No. 12/924,220, filed on Sep. 23, 2010, now Pat. No. 8,920,590.

(51) Int. Cl.
*B32B 33/00* (2006.01)
*B32B 37/12* (2006.01)

(52) U.S. Cl.
CPC .......... *B32B 37/1292* (2013.01); *B32B 33/00* (2013.01)

(58) Field of Classification Search
CPC .............. B32B 7/045; B32B 7/12; B32B 7/14
USPC ........ 156/250, 252, 253, 256, 267, 269, 295
See application file for complete search history.

(56) References Cited

U.S. PATENT DOCUMENTS

| 2,402,631 | A |   | 6/1946 | Hull |
| 3,363,552 | A | * | 1/1968 | Rarey ........................... 101/129 |
| 3,444,732 | A |   | 5/1969 | McKinley et al. |
| 3,826,701 | A |   | 7/1974 | Miller |
| 3,925,139 | A |   | 12/1975 | Simmons |
| 4,035,334 | A |   | 7/1977 | Davydov et al. |
| 4,107,861 | A |   | 8/1978 | Johnson |
| 4,266,687 | A |   | 5/1981 | Cummings |
| 4,390,104 | A |   | 6/1983 | Cummings |
| 4,423,819 | A |   | 1/1984 | Cummings |
| 4,514,248 | A |   | 4/1985 | Cummings |
| 4,527,703 | A |   | 7/1985 | Cummings |
| 4,550,842 | A |   | 11/1985 | Cummings |
| 4,598,834 | A |   | 7/1986 | Singletary, Jr. |
| 4,661,189 | A | * | 4/1987 | Voy et al. ..................... 156/248 |
| 4,758,456 | A |   | 7/1988 | Muscala |
| 4,960,216 | A |   | 10/1990 | Giles |
| 5,197,617 | A |   | 3/1993 | Edwards |
| 5,342,673 | A |   | 8/1994 | Bowman et al. |
| 5,435,879 | A | * | 7/1995 | Knutson et al. .............. 156/327 |
| 5,516,583 | A |   | 5/1996 | Zhang et al. |
| 5,564,834 | A |   | 10/1996 | Porchia et al. |
| 5,942,062 | A |   | 8/1999 | Hassall et al. |
| 6,531,025 | B1 |   | 3/2003 | Lender et al. |

(Continued)

*Primary Examiner* — Philip Tucker
*Assistant Examiner* — Christopher C Caillouet
(74) *Attorney, Agent, or Firm* — Roger N. Chauza, PC

(57) ABSTRACT

A seal formed of laminated films adhered to a peel strip. The seal includes a target area free of adhesive, and adhesive surrounding the target area. The seal is formed so that the target area is visually distinguished from the surrounding adhesive to facilitate accurate placement of the seal on a medical container by a user. The use of a large adhesive dot pattern enhances the peripheral edge of each adhesive dot to provide a prominent and visual lattice. The prominent and visual lattice distinguishes the adhesive areas of the seal from the non-adhesive areas. The lattice boundary surrounding each adhesive dot is still prominent and visible when a clear and transparent adhesive is applied to selected surfaces of the seal.

18 Claims, 5 Drawing Sheets

(56) References Cited

U.S. PATENT DOCUMENTS

| | | |
|---|---|---|
| 6,578,723 B1 | 6/2003 | Tyner |
| 6,589,616 B2 | 7/2003 | Muggli et al. |
| 6,632,403 B1 | 10/2003 | Barmore et al. |
| 7,135,088 B2 | 11/2006 | Lasson |
| 7,318,590 B2 | 1/2008 | Razavi |
| 7,695,584 B2* | 4/2010 | Utz ................... 156/248 |
| 2001/0010847 A1* | 8/2001 | Otsuka et al. ........... 428/36.1 |
| 2002/0142156 A1* | 10/2002 | Maloney ............... 428/343 |
| 2003/0196914 A1 | 10/2003 | Tzou et al. |
| 2004/0001937 A1* | 1/2004 | Nissing et al. ........... 428/131 |
| 2005/0022924 A1 | 2/2005 | Blackburn |
| 2008/0150186 A1 | 6/2008 | Abrams |
| 2011/0277910 A1* | 11/2011 | Wang ............... B32B 5/18 156/77 |

* cited by examiner

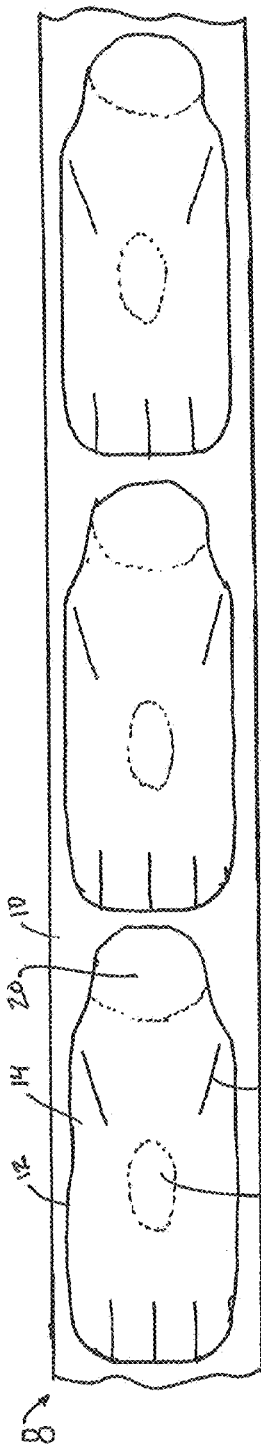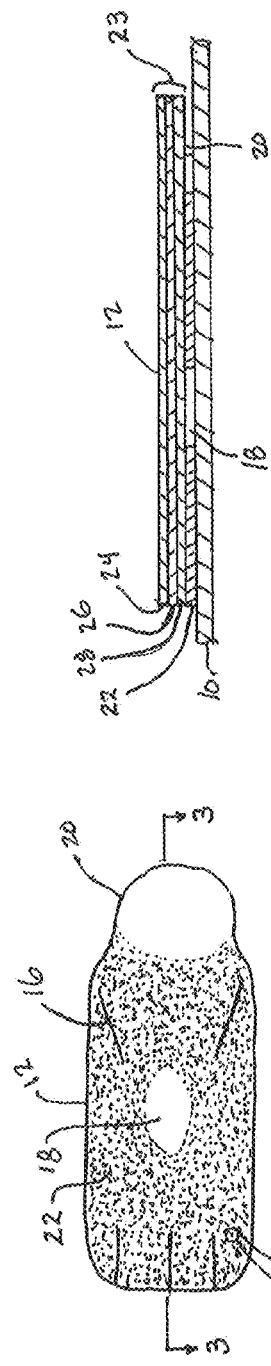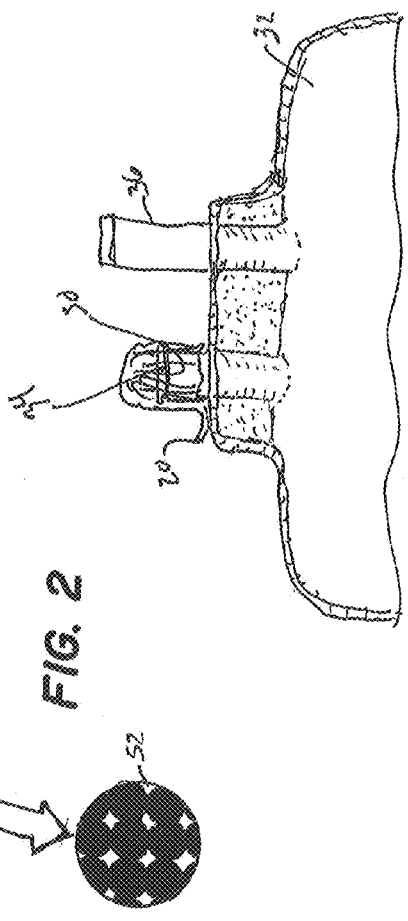

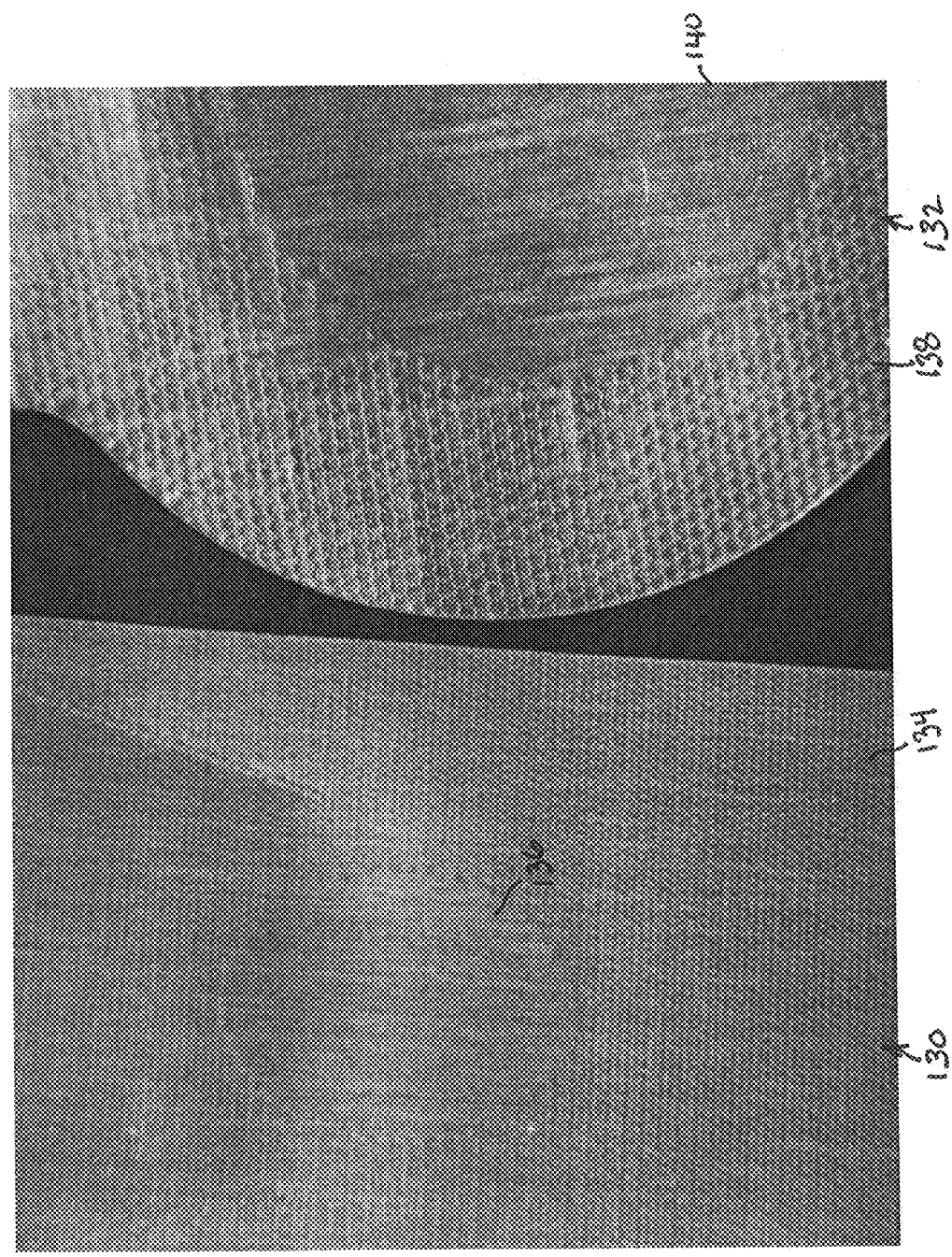

TAMPER EVIDENT SEAL WITH VISIBLE ADHESIVE DOT PATTERN

RELATED APPLICATION

This is a continuation-in-part patent application of pending U.S. CIP patent application Ser. No. 12/924,220 filed Sep. 23, 2010, the disclosure of which is incorporated herein by reference.

TECHNICAL FIELD OF THE INVENTION

The present invention relates in general to methods and apparatus for sealing medical containers, and more particularly to techniques for sealing such containers to provide evidence of tampering.

BACKGROUND OF THE INVENTION

Hospital patients often undergo treatments of many types using intravenous injections of liquids such as antibiotics, vitamins, drugs, narcotics and many other pharmaceuticals. The injection of the liquid is administered into the veins of the patient. As such, it is important that the intravenous process and equipment remain clean and sterile in order to reduce the possibility of allowing bacteria and other undesirable organisms to enter the body of the patient.

Intravenous solutions may include dextrose solutions, sodium chloride and many other solutions. Such solutions can be injected by intravenous means into a patient, and such solutions can be modified to add other treatment liquids, including those noted above. Intravenous (IV) bags are typically delivered to hospitals or pharmacies with the base solutions of dextrose, sodium chloride, etc. The IV bags are generally delivered within individual protective plastic shipping bags to maintain the IV bags in a sterile condition. The hospital assistant or the pharmacist then removes the IV bags containing the IV solution from the protective plastic cover and discards the latter. In a typical day at many hospitals, clinics and pharmacies, several hundred IV bags may be processed so as to have the proper pharmaceutical solution added to the IV solution, as prescribed by the doctors.

The pharmacist, for example, may have delivered to him/her multiple sheets of adhesive labels from the hospital, where each label is preprinted with information which identifies the patient, the size of the IV bag, the medical solutions to be added, the dosages thereof, and other parameters necessary for the proper administration of IV solutions to the correct patient. The preparation of IV bags for the proper modification of medical solutions is conducted in a clean and sterile environment, usually under a laminar air flow hood. The IV bags are removed from the respective protective coverings in the sterile environment. The pharmacist then identifies the drug to be added to the base IV solution in the bag. The drug is drawn into a syringe, or the like, from a bottle and then added to the IV bag by way of the injection port. The injection port of an IV bag includes a spout or portion extending from the bag, with a self-sealing rubber membrane through which the syringe needle is inserted to inject the drug into the IV bag. When the needle is withdrawn, the rubber membrane reseals to maintain the contents of the IV bag sterile.

Once the base IV solution has been modified in the manner desired, an adhesive seal is applied to the injection port of the IV bag. The adhesive seals are generally of a laminated construction, including a foil and one or more layers of a polypropylene material. The type of seals typically applied to injection ports of IV bags and bottles are disclosed in U.S. Pat. No. 4,266,687 by Cummings; U.S. Pat. No. 4,390,104 by Cummings; U.S. Pat. No. 4,423,819 by Cummings; U.S. Pat. No. 4,514,248 by Cummings; U.S. Pat. No. 4,527,703 by Cummings and U.S. Pat. No. 4,598,834 by Singletary. These seals include a target area surrounded by adhesive. The target area is a non-adhesive spot on the seal that contacts the rubber membrane of the injection port. The surrounding area is adhesive covered for adhering to the surrounding spout portion of the injection port. Importantly, the seal not only maintains the rubber membrane covered and free from bacteria contamination, but the seal includes slits cut therein so that if attempted to be removed, the seal is torn or otherwise destroyed. Accordingly, any tampering of the seal is readily evident. Lastly, the presence of a seal on the injection port of the IV bag is an indication to the pharmacist that the modification of the contents of the IV bag is complete, and no other processing of the IV bag is required. The presence of the seal on the IV container thus prevents the accidental injection therein of an additional medication, or a different medication.

In the manufacture of the IV bag seals noted in the above-identified patents, the target area is free from adhesive in that the adhesive at that spot is covered by a paper dot. The seal also includes a pull tab that has a non-adhesive underside, also covered by paper adhered to the adhesive. Thus, the seal is fabricated by covering the entire underside of the laminated foil/poly strip with an adhesive. Paper is then applied to those areas in which it is desired to be non-adherent. Lastly, a silicone-faced peel strip is attached to the adhesive side of the seal. The peel strip is removed from the seal just prior to use by the pharmacist when applying the seal over the injection port of the IV bag.

While the IV bag seals of the prior art have adequately provided their intended functions, they are not as cost effective as could be. Rather, additional manufacturing steps are required in order to make the laminate structure non-adherent at specified areas. Attempts have been made to make the adhesive areas of the IV bag seals more distinguishable to the pharmacist, as compared to the target area, so that the seal can be easily centered and placed on the spout of the IV bag without allowing adhesive areas of the seal to contact the membrane portion of the spout. To that end, the SecurSeal® tamper evident seal manufactured by Winfield Laboratories of Richardson, Tex., places a color agent in the adhesive to make the adhesive and non-adhesive areas of the seal visually distinguishable to the pharmacist. The colored adhesive is applied to selected surfaces of the seal using screen printing process, where the adhesive is applied through a screen, thereby leaving a pattern of colored adhesive dots. In the areas not to be covered with the adhesive, such as the target area and the pull tab area of the seal, the screen printing process prevents adhesive dots from being applied to such areas.

It can be seen from the foregoing that a need exists for a new seal structure for an IV bag or a bottle, where the seal is economical and thus cost effective, as well as provides an enhanced visual differentiation between the adhesive and non-adhesive areas of the seal. Another need exists for a method of fabricating the seal that does not require substantial modification of conventional screen printing processes to apply the adhesive so that the non-adhesive target area is more easily distinguished from the adhesive areas.

SUMMARY OF THE INVENTION

In accordance with the principles and concepts of the invention, there is disclosed a seal, and method of manufacture thereof, for use with medical and other containers.

In accordance with an important feature of the invention, the seal is manufactured in an in-line process using a roll of a laminate material and a roll of peel strip material, screen printing an adhesive in a patterned manner on the peel strip, and then bringing the laminate and the peel strip together under compression to form a long composite strip. A rotary die cutter cuts the laminate and the adhesive to form the individual seals on the peel strip. In accordance with an important feature, the adhesive is clear and transparent and is zone printed to form areas free from adhesive, which are the target area and the pull tab area of the seal.

In accordance with another feature of the invention, in order to visually distinguish the adhesive-free target area from the adhesive-covered areas of the seal, the adhesive is screen printed to form a matrix of dots, and then the adhesive dots are compressed between the peel strip and the foil layer until the peripheral edges of the compressed dots touch or merge together. This not only prevents paths of bacteria which could otherwise migrate through the adhesive layer of the seal to the target area, but also forms a visible lattice defined by the boundary around each adhesive dot. The lattice is visible and readily distinguishable from the adhesive free target area.

In accordance with another embodiment of the invention, disclosed is a method of applying adhesive to a substrate, which includes using a perforated adhesive dispenser through which adhesive is forced to dispense a plurality of adhesive dots. A density and size of perforations is used in the perforated dispenser so that the dot pattern of dispensed adhesive is visible by a naked eye of a user of the substrate. The next action is the dispensing of the adhesive dots on the substrate.

In accordance with yet another embodiment of the invention, disclosed is a method of applying adhesive to a substrate, which includes using a perforated adhesive dispenser through which adhesive is forced to dispense a plurality of individual adhesive dots on a seal for sealing a medical container. Each individual adhesive dot is compressed so that at least a portion of a peripheral edge thereof moves laterally and merges with one or more neighbor individual adhesive dots which are also compressed. The peripheral edge surrounding each of the compressed adhesive dots is used as a lattice to visually distinguish the adhesive-covered areas of said seal from the non-adhesive areas.

With regard to yet another embodiment of the invention, disclosed is a method of applying adhesive to a substrate, which includes applying a pattern of clear adhesive dots to selected areas of one of a peel strip or a foil layer during fabrication of a seal for a medical container, and not applying the clear adhesive to a target area of the seal; compressing the peel strip and the foil layer together to compress the pattern of clear adhesive dots therebetween to the extent that the clear adhesive dots form respective bodies that spread laterally; using a peripheral edge of each compressed clear adhesive dot body to visually distinguish the selected adhesive-covered areas of the seal from the non-adhesive target area; and whereby the clear adhesive dot bodies are not visually distinguishable from the non-adhesive target area, but the peripheral edges of each compressed clear adhesive dot defines a visual lattice that is visually distinguishable from the target area.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 1 is a top view of a strip of IV bag seals constructed according to a preferred embodiment of the invention;

FIG. 2 is a bottom view of a seal subsequent to removal from the silicone-coated peel strip, with the adhesive pattern shown in enlarged form;

FIG. 3 is a cross-sectional view, taken along line 3-3 of FIG. 2;

FIG. 4 is a side view of a portion of an IV bag, with the seal fixed thereto;

FIG. 12 is a much enlarged plan view of a medical container seal constructed according to prior techniques; and FIG. 13 is a much enlarged plan view of a medical container seal constructed according to the principles and concepts of the invention.

DETAILED DESCRIPTION OF THE INVENTION

Figure 6:
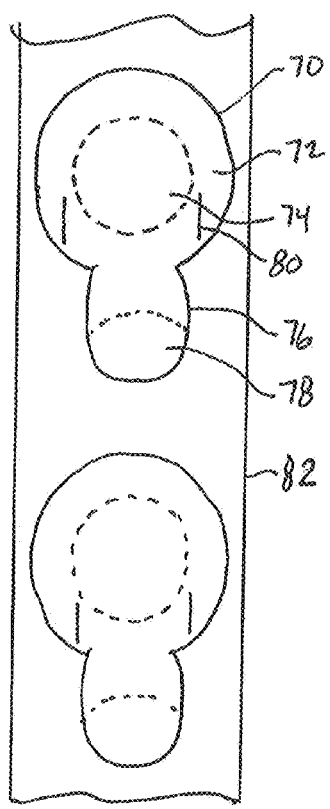
FIG. 6 illustrates another embodiment of a seal according to the invention.

With reference to FIGS. 1 and 2, there is shown a strip 8 of IV bag seals 12 according to the invention. It should be understood that the seal 12 is well adapted for sealing medical containers other than IV bags. In any event, the seals 12 are adhered to a silicone-coated peel or release strip 10. When distributed to a pharmacy, hospital, clinic or other user, a strip 8 of about 1,000 seals are contained within a dispenser box or container, such as described in U.S. Pat. No. 8,002,113, by Gary Cummings.

Each seal 12 is characterized as having a body 14 with one or more slits, one shown as reference character 16. The body portion 14 of the seal 12 includes a non-adhesive target area 18. The seal 12 further includes a pull tab 20 for use in removing the seal 12 from the peel strip 10 and handling the same, without touching the underlying adhesive-coated area 22 shown in FIG. 2. The entire bottom surface of the seal 12 is coated with an adhesive 22, except for the target area 18 and the pull tab 20. The target area 18 is free from adhesive as it is undesirable to allow the adhesive material to be placed in contact with the sterile rubber membrane of the IV bag injection port, or the port of a vial. The pull tab 20 is free from adhesive so that the seal 12 can be easily gripped and removed from the peel strip 10. Unlike the prior art seals, the target area 18 and the pull tab 20 do not include paper-covered areas. The manner in which the adhesive 22 is transferred to the seal 12 is described in more detail below.

The construction of a seal according to one embodiment is shown in FIG. 3. The seal 12 is constructed of a laminated structure 23 having a top polypropylene film 24, a middle layer of a metal foil 26 and a bottom film 28 of polypropylene. The top and bottom polypropylene films 24 and 28 can be about six mils thick. The metal foil 26 can be a silver-colored aluminum metal of about seven mils thickness. Other materials formed of other thicknesses, and colors, can be used as the laminated structure. Such structures are well known in the art of seals for medical containers. Indeed, the seal 12 may be constructed of a single layer of material. In order to visually distinguish seals for different uses, a colored film can be applied between the top polypropylene layer 24 and the metal foil 26. Moreover, the top polypropylene layer 24 can be colored so as to be easily identified. The bottom polypropylene layer 28 can also be colored.

The laminated structure 23 is releasably attached to the silicone-coated peel strip 10 by an adhesive 22 which can be colored. The colored adhesive 22 can serve to visually define the target area 18, as shown in FIG. 2. The adhesive is applied in a dot pattern in such a manner as to enhance the visual distinctness, as compared to the non-adhesive areas of the seal 12. The adhesive 22 does not adhere to the silicone surface of the peel strip 10, but does adhere to the lower surface of the bottom polypropylene film 28. As such, when the laminate structure 23 is pulled from the peel strip 10, the adhesive 22 remains with and becomes part of the seal 12. As shown in FIG. 2, the target area 18 and the bottom side of the pull tab 20 are free from adhesives.

In use, when the pharmacist needs a seal for sealing a completed IV bag 32, the seal 12 is removed from the peel strip 10. The pharmacist then visually locates the target area 18, and applies the seal 12 to the spout 30, making sure the target area 18 is centered over the rubber membrane 34. This is shown in FIG. 4. In addition, the pharmacist can wrap or fold the seal 12 down around the spout 30. As noted above, the existence of the seal on the IV bag 32 conveys the message that the contents of the IV bag 32 have been altered or modified according to the preprinted label instructions, and the IV bag is ready to be transferred to the hospital or clinic. In the event that the seal 12 is attempted to be removed from the spout 30 of the IV bag 32, telltale signs of tampering are two fold. First, the seal 12 will be destroyed as one or more of the slits 16 will cause tearing of the body 14 of the seal 12. Secondly, portions of the colored adhesive 22 will remain on the spout 30 or the IV bag itself 32. The residue of the colored adhesive 22 is readily apparent on clear plastic sidewall of the IV bag. The IV solution is dispensed via the IV port 36.

Figure 5:
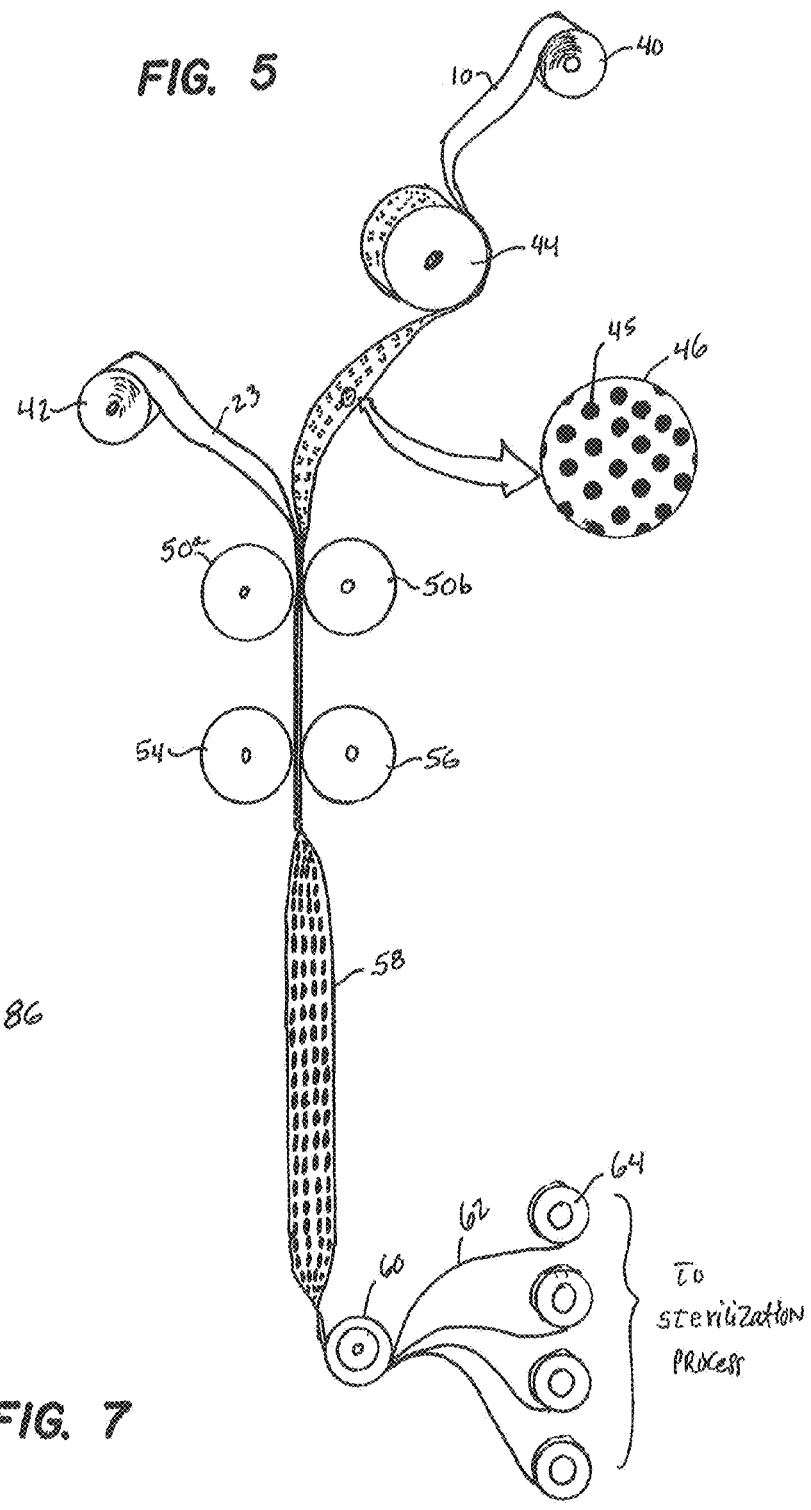
FIG. 5 is a diagram of an in-line manufacturing process adapted for fabricating the seals of the invention.

The manufacture of the seal 12 is described in detail below, and shown schematically in FIG. 5. A long, wide roll 40 of a silicone-coated peel strip material 10, and a long, wide roll 42 of a laminate material 23 constitute the starting materials for the in-line process. It should be understood that the laminate structure 23 of the seal 12 can be other materials, and can even be a single layer or film of material. The width of both rolls 40 and 42 of material is preferably sufficient to make a plurality of seals per unit width of material. In the preferred embodiment, a unit width of material is sufficient to make 7-9 seals 12. The shape of the seals in a unit width may be different from that shown in FIG. 1. The silicone-coated peel strip 10 undergoes a process where the adhesive 2, whether colored or not, is patterned onto the silicone side of the strip 10. The adhesive 22 can be of a hot melt type, a solvent, acrylic or other type suitable for use with screen print equipment. A colored pigment can be added to the adhesive 22 to impart a color thereto. The colored pigment can be in a powder or liquid form, such as a colored ink compatible with the type of adhesive employed. The process includes a screen printer utilizing a mesh roller 44 having small openings formed in a pattern with the shape shown by the adhesive-coated area 22 of FIG. 2. The pattern is repeated around the mesh roller 44. Importantly, no adhesive 22 is deposited in the areas corresponding to the target area 18 or the pull tab 20. In a preferred embodiment, the colored adhesive 22 is screen printed on the silicone peel strip 10, not the laminate structure 23 of the seal 12. Alternatively, the adhesive 22 can be screen printed on the laminate structure 23. The colored adhesive 22 is forced through small holes in the roller 44, whereupon a dot pattern 45 of a desired thickness of adhesive 22 is transferred to the peel strip 10. The thickness of the colored adhesive is on the order of between about 0.9-1.10 mils, plus or minus 0.1 mil. With such a thin layer of adhesive, the adhesive is used efficiently without compromising the adhering strength of the adhesive material. Because of the thin film of adhesive utilized, the coloring agent added thereto should be substantial so that the thin film of adhesive is visually distinguished from the underlying laminate structure to which it is adhered. Without the use of a coloring agent, it is believed that a raw adhesive material coated as a thin film on a substrate would not be visually distinguished from the underlying substrate. The dot pattern 45 may be as shown in the enlargement 46 of FIG. 5. The adhesive 22 can be applied in other patterns, such as cross-hatching, etc. The adhesive 22 used is colored before being applied to the seal 12, and does not change color once applied to the seal 12. For example, the adhesive 22 does not change color either when the peel strip 10 is removed, or when the seal 12 is removed from the container.

In the prior fabrication of the seal 12, a screen having a pattern of holes was used to squeegee the liquefied adhesive therethrough and onto the carrier strip 10. The dots of adhesive were small and closely spaced apart to form a uniform grid pattern. As such, after fabrication and when the pharmacist peeled the seal 12 from the peel strip 10, the dot pattern was barely noticeable even under very close scrutinization and examination by the naked eye. The adhesive dot pattern of the seal 12 was certainly not suitable for visually distinguishing the adhesive area from the non-adhesive target area by a pharmacist, or other user, when pulling the seals 12 from a roll of seals and applying the same to respective container spouts.

In the process, the adhesive patterned side of the wide peel strip 10 is brought into contact with the laminate structure 23, and pressed together with a pair of spaced-apart rubber nip rollers 50a and 50b. The nip rollers 50a and 50b squeeze the materials 10 and 23 together sufficiently to cause the adhesive dot pattern 45 to be compressed. When compressed, the adhesive 22 adheres to the surface of the polypropylene layer 28. This compression step essentially transfers the adhesive 22 from the peel strip 10 to the laminate structure 23. After compression, the adhesive dot pattern 45 is merged together, much like that shown in the enlargement 52 of FIG. 2. The diameter of the patterned dots 45, as well as the thickness of the adhesive 22 can be adjusted to achieve the merged pattern of FIG. 2. The merging of the adhesive dot pattern 45 is important to prevent any passages or channels between target area 18 and the environment. The presence of any passages could lead to the migration of bacteria and the like to the target area 18 and contamination thereof.

The continuous roll material adhered together is coupled to a rotary die cutter station. The rotary die cutter includes a roller 54 with an engraved cylinder, where the cutting pattern is repeated in all rows around the peripheral surface of the cutting roller 54. The rotary die cutter is removable and replaceable with another cutter having different shaped engraved patterns to produce seals with different shapes. It is understood that when using different shaped seals, the adhesive pattern screen would also be different to match the shape of the pattern of the rotary die cutter. In addition to cutting the outer edge of the seal 12, the cutter also cuts the tear slits 16. The rotary die cutter 54 is synchronized with the adhesive pattern on the peel strip 10 so that the outline cut for each seal 12 corresponds to the outline of the adhesive pattern. Synchronization of the various in-line stations is achieved by the use of gear-driven equipment. The number of engraved areas in a unit width of the rotary die cutter 54 is a function of the width of the roll material 10 and 23. FIG. 5 illustrates that there are four seals cut per unit width. The rotary die cutter 54 operates in conjunction with a smooth surface roller 56. The spacing between the cutting edge of the engraved areas and the surface of the roller 56 is such that the cuts are made entirely through the laminate structure 23, as well as through the layer of adhesive 22. The only material that is not cut is the peel strip 10.

The waste laminate material and associated adhesive is removed by a processing station, not shown, and wound onto a waste roll and disposed of appropriately. The remaining composite material strip 58 that proceeds in the processing of the invention is the wide peel strip 10 with the individual seals 12 attached thereto. The wide material 58 is wound onto a roll several thousand feet long. The roll is then placed on a rewinding machine (not shown) that slits the rows apart and winds the product onto a core with the desired number of seals on the roll, such as 1,000 seals per roll. This avoids interrupting the machine each time a roll of 1,000 seals is completed. In the example, the wide strip 58 is made with four seals across the width of the material strip 58, and thus there are three rotary knives to cut the wide strip 58 into four individual strips, one shown as numeral 62. The individual strips 62 are of a width having only a single seal 12, although this is not a necessity. In the event that the user desires to have strips of two or more seals wide, this can be accommodated by configuring the rotary cutter 60 with the appropriate number of cutting blades.

The individual seal strips 62 are wound onto individual spools. One spool is shown as numeral 64. The spools of seal strips 62 are placed into respective dispenser boxes or containers, such as would be used by the pharmacist when placing the seals 12 on the injection ports of IV bags. A clam shell type of plastic container of the type described in U.S. Pat. No. 8,002,113 can be used to provide a dispenser box when the roll of seals 12 is placed therein. The end of the strip of seals can be threaded through an exit opening in the plastic container, and the clam shell halves snap locked together. The individual containers of seals 12 are next sterilized to remove all bacteria and germs from the product. If a box is used as a container, then the spool of seals can be held in a plastic holder housed within the box to allow rotation of the roll of seals during dispensing. The sterilization of boxed rolls of seals 12 can be carried out in any conventional manner. In the preferred form, the boxed rolls of seals 12 are placed in a vented plastic bag and placed in a sterilization chamber. A sterilizing agent, such as ethylene oxide gas, is injected into the chamber at a specified temperature, pressure and humidity, for a specified time to destroy all bacteria. This type of sterilizing gas permeates through the various materials of the seal 12 and is effective to sterilize the target area 18. The sterilizing gas is then removed from the chamber. The boxes remain in the bags and are made ready for shipment to the users of the seals 12.

FIG. 6 illustrates another embodiment of the invention well suited for use with bottle containers holding medical drugs and the like. Bottles of this type have a rubber membrane held within the opening of the bottle by a metal rim. The seal 70 has a round body 72 with a round target area 74 free of adhesive. The round body 72 of the seal 70 is well adapted for attachment to the rim over the rubber membrane. The bottom side of the seal body 72 is coated in a dot pattern of a colored adhesive in the manner described above. The body 72 of the seal 70 can be adhered to the metal rim and/or to the neck of the bottle. A pull tab 76 includes on a bottom surface an adhesive free area 78 for allowing a user to easily grasp the seal 70 and remove it from the peel strip 82. One or more slits 80 are provided for allowing the body 72 of the seal to be easily torn should it be attempted to be removed from the bottle. The seal 70 can be made in the same manner described above, except with a different pattern for the adhesive dispensing screen 44, and a different shape engraved cylinder on the rotary die cutter 54.

Figure 7:
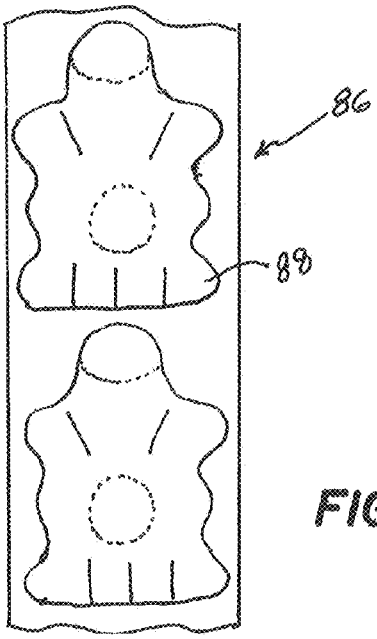
FIG. 7 illustrates yet another embodiment of a seal according to the invention.

FIG. 7 illustrates a shape of yet another seal 86 constructed according to the concepts of the invention described above. The shape of this seal 86 is readily adapted for use with an IV bag having a side injection port. The multiple ears 88 can be folded to conform around the side injection port.

Figure 8:
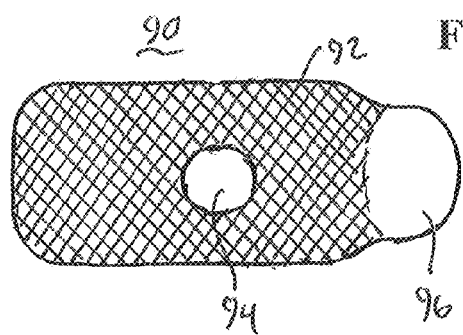
FIG. 8 illustrates the metal foil portion of a seal, patterned with a color agent to color the foil area, except the target area and the pull tab area.

In accordance with another embodiment, FIG. 8 illustrates a seal 90 constructed so that there is a prominent visual distinction between the adhesive-covered areas and the adhesive-free areas. The cross-hatched area 92 depicts an area of the seal that is colored, whereas the areas 94 and 96 that are not cross-hatched depict areas of the seal 90 that are not colored. The area 94 represents the target area of the seal 90, and the area 96 represents the pull tab for grasping to remove the peel strip, not shown. The coloring of the pull tab 96 area is optional. According to this embodiment, the metal foil portion of the seal 90 is fabricated to impart a color to only the cross-hatched areas 92, and leave the other areas 94 and 96 free of the color. In other words, the areas 94 and 96 will remain a neutral aluminum foil color, such as a shiny silver color having a chrome-like appearance. The cross-hatched area 92 can be colored any brilliant color, such as green, red, blue, yellow, purple, orange, etc.

During processing of the components of the seal 90, one side of the metal foil can be passed by a color agent dispenser to color selected areas of the metal foil. An ink, stain, paint or other color agent can be applied to the cross-hatched area 92, and leave the other areas 94 and 96 free of the color agent. Techniques exist where a liquid color agent can be jetted onto the side of the metal foil at selected areas. As such, the liquid color agent can be jetted as a large number of high density dots onto the metal foil in the area 92. As an alternative, the color-free areas 96 and 94 can be masked with respective adhesive patches applied to the metal foil, and a color agent sprayed onto the entire side of the metal foil. Then, the adhesive patches can be removed to expose the color-free areas 94 and 96 of the foil material. Another method of coloring the surface of the metal foil is to screen print a colored agent onto the foil surface, where the screen is patterned to only allow the color agent to be applied to the cross-hatched area 92. An ink, dye or paint can be used as the color agent during the screen printing process.

A roll of the metal foil can be processed to apply the color agent in a patterned manner to the one side of the foil material. This can be carried out prior to the lamination of the same to other materials, such as one or more layers of polypropylene. The colored metal foil can then be rolled back up into a roll and used for subsequent processing to form the complete seal, as described above. The roll of the color-patterned seals can then be used during the normal lamination process where the peel strip is adhered to the metal foil to form the composite seal 90. The adhesive can be applied as a thin film, and thus is very transparent to thereby allow the colored surface thereunder to be easily seen. It is well within the skill of those in the art to time or otherwise control the movement of the roll of the colored metal foil so that an adhesive is applied only to the colored areas 92 of the metal foil, and not applied to the color-free areas 94 and 96. As noted above, the patterned adhesive can be applied to the peel strip, and then the peel strip registered with the metal foil and pressed onto it to adhere the layers together until the peel strip is removed by the user of the seal. The adhesive can also be applied in a patterned manner directly to the colored surface 92 of the metal foil, and then the peel strip pressed onto the adhesive. The cutting of the laminate structure to the desired shape can be carried out in the manner described above.

It can be appreciated that the color-free areas 94 and 96, and especially the target area 94, are visually distinguishable to a great extent from the surrounding colored area 92. This allows a user of the seal 90 to easily align the target area with the spout of a container or vial and apply the same thereto without allowing the adhesive covered areas to touch the spout membrane. As noted above, this is important when applying a seal to a medical container and preventing the adhesive from being transferred to the membrane of the container spout.

Figure 9:
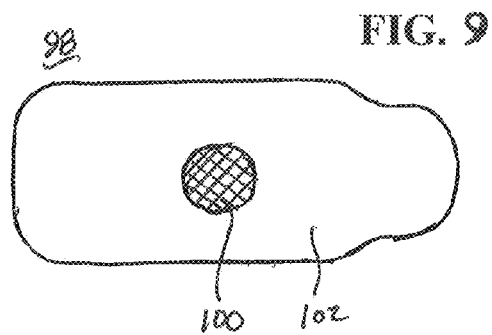
FIG. 9 illustrates the metal foil portion of a seal, patterned with a color agent to color only the target area.

FIG. 9 illustrates another embodiment of the metal foil layer of a seal 98, where the color agent is applied only to the target area 100, and not to the remainder of the metal foil layer. Similar processing can be carried out in the manner described above, but instead applying the color agent only to the target area 100. Again, the seal 98 of this embodiment has a target area 100 that is highly distinguishable from the color-free areas 102, to thereby facilitate alignment of the seal 98 when applying the same to a container.

In either of the embodiments of FIGS. 8 and 9 described above, it is easy to form selected areas of the seal 90 or 98 with a highly colored appearance to more easily distinguish the target area of the seal from the surrounding area. The deep coloring of the metal foil is much easier to achieve than forming a very thin layer of colored adhesive so that the color thereof is deep and easily distinguishable from the non-adhesive areas. However, those skilled in the art may find it advantageous to use both a colored metal foil (patterned or not) as well as a colored adhesive. The color agent added to the adhesive can be micron-size particles, or other suitable size particles, mixed with the adhesive to provide a visual distinction with the surrounding non-adhesive areas. The particles can be silver colored to provide a reflectivity to the adhesive that is otherwise not a characteristic of the adhesive. To that end, the reflective or colored particles can be mixed so that the density thereof is substantially high in the adhesive to provide a highly reflective surface for the adhesive.

In order to provide a visual distinction between the target area of the seal, as compared to the surrounding areas, the surface of the metal foil can be altered to change the reflectivity thereof. For example, when using a metal foil having a shiny silver surface, the surface of the foil forming the target area can be altered or spoiled to change the reflectivity thereof.

Figure 10A:
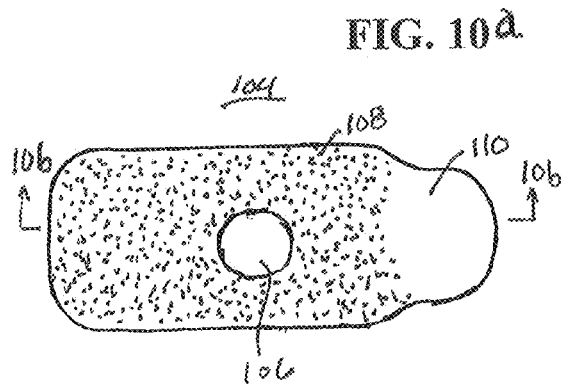
FIG. 10a is a top view of a seal according to another embodiment, in which the reflective properties of the adhesive are used to distinguish from the adhesive-free target area.
Figure 10B:
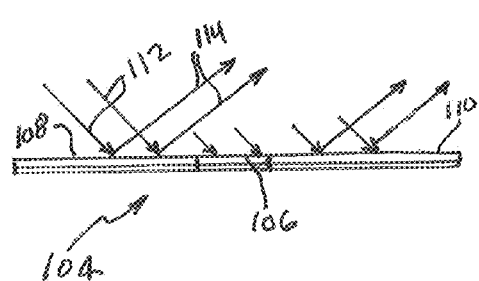
FIG. 10b is a cross-sectional view of the seal of FIG. 10a, taken along line 10b-10b, which illustrates the use of reflective properties of the adhesive.

FIGS. 10a and 10b illustrate a seal 104 constructed according to another embodiment. Here, the reflective properties of the adhesive of the seal 104 are used to distinguish the target area 106 and the pull tab 110 from the surrounding adhesive-covered area 108. The adhesive used in this embodiment can be modified to alter the normal properties thereto for increasing the reflectivity thereof. There are currently available adhesives that exhibit unique reflective properties. Such adhesives are available from 3M, including reflective inks that can be added to adhesives. When using an adhesive with reflective properties, the adhesive-covered area can be visually distinguished from the target area. The use of a reflective adhesive can also be used in combination with a target area that has a reduced reflective characteristic. The reflectivity of the target area can be reduced by spoiling the smooth and shiny surface thereof. The reflectivity of the target area can be spoiled by slightly etching the area to reduce the shiny characteristic. The reflectivity of the target area can also be spoiled by using a dull or flat paint, ink or other liquid that can be selectively applied to the target area of the seal. Many other methods can be used to reduce the reflectivity of the target area.

With regard to FIG. 10b, there is illustrated a sectional view of the seal 104 of FIG. 10a. The top of the seal 104 illustrates the adhesive layer. The bottom of the seal 104 illustrates the laminated structure which includes a metal film and one or more layers of polypropylene. When utilizing an adhesive with reflective properties, the light 112 striking the side of the seal 104, as shown, is reflected 114 off of the adhesive 108 and can be seen by the user attempting to apply the same to the spout of a container, or vial port. The reflections 112 of the light rays appear shiny to the observer. It can be seen that the light rays 116 striking the target area 106 are not reflected, or at least are reflected with reduced intensity. As such, the user of the seal 104 can more easily distinguish the target area 106 from the surrounding adhesive area 108 and more easily apply the same to a container.

As an alternative to the modification of the reflective properties of the adhesive, other visual characteristics can be considered when choosing an adhesive. For example, adhesives that are responsive to certain wavelengths of light can be used. An adhesive that absorbs certain wavelengths of light, while the target area does not, can be used as a mechanism to provide a visual distinction between the areas.

The reflectivity of the adhesive-covered areas of the seal 12 is also a function of the size and density of the dot pattern. It has been found that with larger-size dots of adhesive, the adhesive covered areas of the seal 12 are more distinguishable from the non-adhesive areas, such as the target area and the pull tab area. Indeed, when using a 75 hybrid mesh screen for screen printing the adhesive to a surface of the seal, as has been done with prior seals, an adequate amount of adhesive was deposited to achieve a good adhesion to the IV container spout. The 75 hybrid mesh screen was initially selected to conserve the amount of adhesive used for each seal, thereby reducing the cost of manufacture thereof. The screen printing of the hot melt adhesive employs a perforated drum-like structure holding the liquefied hot melt adhesive, which is then squeezed through the openings in the drum onto the substrate over which the drum is rolled.

Figure 11A:
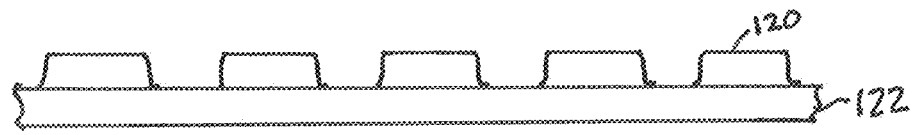
FIGS. 11a-11d are different views of a seal constructed during various steps of the process.

However, it has been found that when using a larger mesh, such as 40 mesh openings in the perforated drum of the screen printer, not only is more adhesive dispensed onto the substrate of the seal 12, but after fabrication of the seal, the reflectivity of the large dot pattern produces a visual effect that more easily distinguishes the adhesive and non-adhesive areas of the seal. The additional adhesive provides a better adherence of the seal to the spout of an IV container, or the like. In the preferred embodiment, a clear and transparent adhesive is applied in a manner illustrated in FIGS. 11a-11d. In FIG. 11a, the hot melt adhesive 120 is applied to a 1.5 mil clear polyester (PET) film that has a silicon release coating, which forms the peel strip 122. The adhesive dots 120 are applied to the silicon-coated surface of the peel strip 122. As noted above, the clear liquefied adhesive 120 is applied through a apertured screen preferably having a mesh size on the order of about 30-50, and more preferably about 40 mesh. The dots of adhesive 120 are separated from each other as deposited on the peel strip 122. The hot melt adhesive has a low cold flow characteristic, and is clear and transparent.

The perforated drum of the screen printer is fabricated to provide zone coating of the adhesive to selected areas of the peel strip 122. In other words, there are zones in which the adhesive is applied in a dot pattern to selected areas of the peel strip 122, and there are other zones in which no adhesive is applied to the peel strip 122. The zones in which no adhesive is applied to the peel strip 122 include the target area and the pull tab area.

Figure 11B:
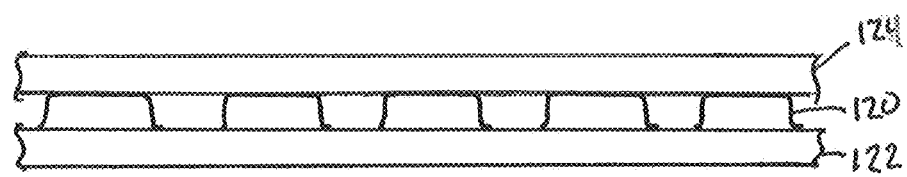

FIG. 11b illustrates the next step in the seal fabrication process, in which a laminated layer 124 is brought into contact with the exposed faces of the bodies of the adhesive dots 120. The laminated layer 124 comprises a three-layer laminate constructed of a top layer of Polyethylene Terephthalate (PET), otherwise known as DuPont's Mylar® material, a middle layer of a metal foil, and a third bottom PET layer. The laminate layer 124 has a thickness of about 0.002 inch to about 0.003 inch. Other single layer materials, and other laminated layers of materials can be employed. In the preferred embodiment, the middle foil layer has a shiny silver surface which is placed toward the adhesive dots 120. The outer side of the foil layer of the laminated layer 124 can be any color which is imparted to the laminated layer 124 during manufacture thereof. The layers of the laminated layer 124 can be laminated using clear or colored adhesives. By utilizing a polyester peel strip 122 and a PET/metallic laminate, the seal is in full compliance with the 797 standards so that it is not the source of air borne particulate matter, as are other seals with paper components. The presence of air borne particulate matter is highly disadvantageous in clean room environments, such as that in which seals are removed and applied to sterile components of medical containers in pharmacies, and the like.

Figure 11C:
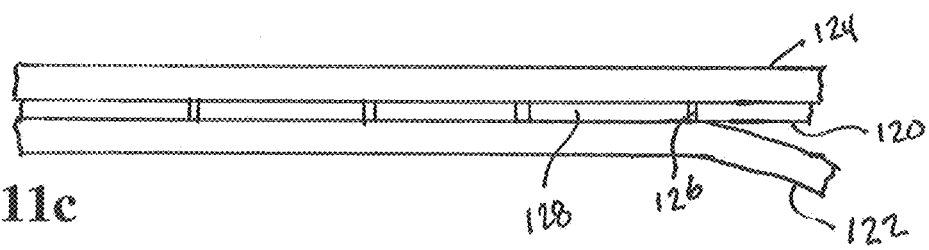

The adhesive dots 120 sandwiched between the peel strip 122 and the laminated layer 124 then undergo a pressure between the layers 122 and 124, such as by the use of spaced-apart nip rollers. As the sandwiched structure is processed through the nip rollers, the adhesive dots 120 are squeezed together sufficiently that the edges of the compressed dots 128 contact the neighbor adhesive dots. This is illustrated in FIG. 11c where the peel strip 122 is shown being separated from the adhesive layer 120 of the seal. In practice, the interface 126 between the merged adhesive dots 120 is visible and is in sharp contrast to the adhesive bodies of the dots 120 themselves. The strip of seals is then further processed and cut in the manner described above.

Figure 11D:
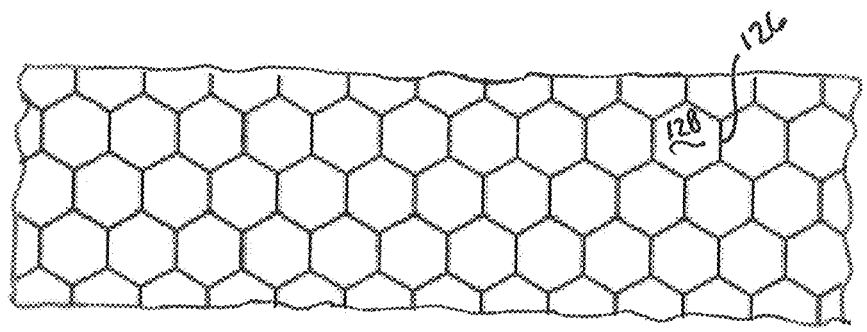

The compressed adhesive dots 128 appear visually as illustrated in the plan view of FIG. 11d. The honeycomb shape is a function of the arrangement of the round holes formed in the 40 mesh barrel-shaped screen that holds the hot melt adhesive during the screen printing process. Each of the six sides of each compressed adhesive dot 128 appears somewhat linear or straight as it is pressed laterally against a neighbor adhesive dot which is also compressed. Since there are six compressed neighbor adhesive dots located around each adhesive dot body, there are also six sides to each adhesive dot, thereby resembling a hexagonal honeycomb structure. The pressure exerted on each adhesive dot 120 by the nip rollers to form a compressed adhesive dot 128, causes each such compressed adhesive dot 128 to contact each other and thereby prevent the formation of a lateral path therethrough. A path through the adhesive layer of the seal 12 is thus prevented, thus preventing the migration of bacteria and the like from entering the target area. Thus, after the fabricated seal 12 is sterilized in the manner described above, the target area remains sterilized as long as the peel strip 122 remains attached thereto. As will be described below, it is the hexagonal peripheral edge of each adhesive dot that is visually distinguished from the body of the adhesive dot, as well as from the non-adhesive areas of the seal.

It can be appreciated that if the mesh number of the screen printer were large, i.e., small openings, then the honeycomb cells would be much smaller, and the visual distinction would be much less between the adhesive-covered areas of the seal 12 as compared to the non-adhesive areas, such as the target area. By experimentation, it has been found that a good compromise between an adequate amount of adhesive applied to the seal layer, and the visual distinction provided, is a 40 mesh screen print structure for the present circumstances.

The visual distinction between a prior art adhesive seal 130 is illustrated in FIG. 12, and the improved adhesive seal 132 is illustrated in FIG. 13. FIGS. 12 and 13 are much-enlarged photographs of the prior art seal 130 placed side-by-side with a seal 132 constructed according to the principles and concepts of the invention. Both seals 130 and 132 are views with the peel strips removed, and the respective adhesive patterns are those that appear to the person attempting to apply the seals to medical containers, it being realized that the photographs are enlarged by a factor of about 6×. Moreover, both seals 130 and 132 have been coated with the same type of adhesive, namely a clear hot melt adhesive having no color additive. The photographs of FIGS. 12 and 13 are enlarged to illustrate the visual difference. In practice, the small dot pattern of the adhesive of the seal of FIG. 12 cannot be seen with the naked eye when viewed at a distance normally used by a person to apply the seal to a medical container. Stated another way, the faint adhesive outline of the prior art could under certain circumstances barely be seen, and only if one knew the pattern was constructed of a grid of dots, and one inspected the pattern closely and focused attention only on the dot pattern. In contrast, the dot pattern of the adhesive of the seal of FIG. 13 can be easily seen with the naked eye when viewed at a distance normally used by a person applying the seal to a medical container. The honeycomb dot pattern of the seal of FIG. 13 easily defines the body of each adhesive dot from the outline or peripheral edge of each dot. It can be seen that while the adhesive dot pattern 134 of the prior art seal 130 is barely distinguished from the non-adhesive target area 136, even when enlarged, this is not the case with the seal 132 constructed according to the present invention. To that end, the large lattice of the dot pattern of the adhesive-covered area 138 of the seal 132 is highly distinguishable from the non-adhesive target area 140.

The utilization of a clear and transparent adhesive overcomes the problem that sometimes occurs when the release liner or peel strip is removed from the foil layer 124. In some cases, the pulling of the release liner causes the adhesive to stretch and become strands before separating from the peel strip. When the peel strip is fully separated from the foil layer, the strands of adhesive retract and stick to the foil layer in small globules. While the globules of adhesive do not generally compromise the integrity of the seal, they are unsightly, especially if the adhesive is colored, which makes the globules more visible. Thus, when employing a clear and transparent adhesive, the globules are much less visible to the user. However, when employing a clear and transparent adhesive, it is more difficult to distinguish the adhesive-covered areas from the non-adhesive covered areas of the seal.

It is believed that even when employing a clear and transparent adhesive on a seal layer, the dot pattern provides different reflections of light to thereby provide a distinguishing characteristic where there is no adhesive. More particularly, it is the interfaces between the dots that provide a disturbance or interference to the light reflections, and thus the honeycomb lattice becomes clearly visible and distinguishable from the adhesive dots themselves. The honeycomb lattice comprises the interface between the adhesive dots, which interface may include bubbles, voids, and other artifacts that cause the incoming light to be diffused in different directions. See FIG. 13 where the hexagonal peripheral area around each adhesive dot is a different shade, as compared to the adhesive dot itself. The adhesive dots themselves generally have a uniform thickness, are clear and transparent, provide a uniform reflection of light, and thus are not generally visually differentiated from the non-adhesive areas. In practice, when viewed by the user, the color of the adhesive dots 138 themselves are generally the same color as the non-adhesive target area 140, but the target area 140 does not have the matrix or grid of visible hexagonal outlines of each dot. Equally important, the size of the adhesive dots allows the honeycomb lattice to be more visible by the naked eye and become distinguished from the dots of adhesive. It is also believed that the reflective silver or chrome-like backing of the foil layer 124 accentuates the reflectivity of light from the backside of the adhesive dots and facilitates the visual distinction. However, it is believed that the use of a shiny surface to which the adhesive dots are applied is not a requirement for the utilization of the invention.

While a 40 mesh screen printing drum is preferable for use with the medical container seals, smaller number mesh screen printing apparatus can be employed with equal effectiveness. As can be appreciated, when using a smaller number mesh screens, the apertures are larger and more adhesive is dispensed on the substrate. It is possible to overcome the problem of dispensing excess adhesive by using different adhesives, different viscosities, temperatures and pressures of application, etc. It is anticipated that screen meshes as large as 25-30 could be utilized to achieve the visual advantages described herein, without encountering excessive amounts of the adhesive.

While the foregoing described the preferred embodiment in connection with the dispensing of round adhesive dots, other shaped dots can be used. For example, square or rectangular shaped dots can be employed, as well as triangular, oval and other shaped dots of adhesive. In addition, the application of the adhesive on a substrate can be achieved by means other than screen printing, such as splatter spraying, in order to create a lattice of visible peripheral edges around the individual adhesive dots.

While the preferred and other embodiments of the invention have been disclosed with reference to a specific medical container seal and method of manufacture thereof, it is to be understood that many changes in detail may be made as a matter of engineering choices without departing from the spirit and scope of the invention, as defined by the appended claims.

What is claimed is:

1. A method of applying an adhesive to form a laminated seal for sealing a medical container where a user of the seal can visually distinguish an adhesive-covered area of the seal from an adhesive-free area of the seal, the method comprising:

using a perforated adhesive dispenser through which a pressure-sensitive adhesive is forced to dispense a plurality of adhesive dots on a layer of the laminate, and using the perforated adhesive dispenser with apertures of a sufficient size as to form individual adhesive dots that are each visible to a naked eye of a user of the substrate after being compressed;

dispensing the adhesive dots on the laminate layer of the laminate seal except for an adhesive-free area of said laminate layer;

compressing the adhesive dots between layers of the laminate seal sufficiently:

a) so that the individual adhesive dots expand radially outwardly but a peripheral edge of each compressed adhesive dot does not merge with a corresponding peripheral edge of a compressed neighbor adhesive dot, and after compression of each said adhesive dot an area between a peripheral edge of each neighbor compressed adhesive dot forms a lattice area that extends to said adhesive-free area, and 1) each compressed adhesive dot remains individually visible after processing, and 2) the compressed adhesive dots reflect light differently from the lattice area between the peripheral edges of each compressed dot, whereby the lattice area between the compressed adhesive dots visually define a boundary around the adhesive-free area of said seal;

b) so that the adhesive dots are not merged together into a uniform layer of adhesive that has no visible edge surrounding the respective compressed adhesive dots, and c) so that there is no path for bacteria between the compressed adhesive dots that would allow bacteria contamination of said adhesive-free area;

protecting the compressed adhesive dots with a removable release liner which forms a laminate layer of said seal; and processing the laminate seal so that once the release liner is manually removed from the laminate seal by the user, the lattice area around the edges of the compressed adhesive dots is visible by the naked eye of the user and visually defines a perimeter of the adhesive-free area that is used by the user to align the laminate seal to the medical container.

2. The method of claim 1, further including depositing spaced-apart round dots of the adhesive and compressing the round adhesive dots.

3. The method of claim 1, further including using a silicone-coated release liner as a layer of the laminate seal.

4. The method of claim 3, further including pressing a foil film against the adhesive dot pattern and said silicone-coated release liner so that when the release liner is removed from the foil, the adhesive dots are compressed and spread out.

5. The method of claim 1, further including leaving adhesive-free areas on the substrate so that the area having the adhesive dot pattern is visually distinguishable from the adhesive-free area of the substrate.

6. The method of claim 1, further including using a perforated mesh screen as an adhesive dispenser, where the size of the perforations in the screen are either 40 mesh, or the size of the perforations are larger than 40 mesh.

7. The method of claim 6, further including using circular perforations in the perforated screen.

8. The method of claim 1, further including pressing the adhesive dot pattern onto a shiny silver side of said foil to compress the adhesive dots.

9. The method of claim 8, wherein the adhesive dot pattern visually appears silver on the silver side of said foil film.

10. The method of claim 9, wherein each said adhesive dot is hexagonal in shape, and the pattern of adhesive dots is like a honeycomb in visual appearance.

11. The method of claim 1, further including using a clear hot melt adhesive to form the pattern of dots on the substrate, where the lattice area between each adhesive dot.

12. A laminated structure manufactured in accordance with the method of claim 1.

13. A method of applying an adhesive to a substrate, comprising:

using a perforated adhesive dispenser through which the adhesive is forced to dispense a plurality of individual adhesive dots on a seal to form an adhesive area for sealing to a medical container;

using the adhesive dispenser to form a non-adhesive area on the substrate that is encircled by said adhesive area;

compressing each individual adhesive dot so that at least a portion of a peripheral edge thereof moves radially outwardly toward but not in contact with one or more neighbor adhesive dots which are also compressed, thereby forming a lattice area between the compressed adhesive dots and thus preventing paths in the adhesive for the migration of bacteria through said adhesive area to said non-adhesive area;

selecting a mesh size for the adhesive dispenser that is sufficiently large so that the individual adhesive dots, when compressed, are clearly visible with a naked eye of a user of the seal and said adhesive dots do not lose their individuality; and using the lattice area surrounding each said compressed adhesive dot as a visible lattice that extends to the non-adhesive area, whereby the visible adhesive dots and the visible lattice visually define the adhesive-covered areas of said seal.

14. The method of claim 13, wherein a background appearance of the substrate of both said adhesive area and the non-adhesive area is the same.

15. The method of claim 13, further including using a clear adhesive that is not otherwise visible to a naked eye of the user of the substrate, but the lattice area around each compressed dot remains visible.

16. The method of claim 13, further including making the seal compliant with a 767 standard.

17. A method of applying an adhesive to a substrate, comprising:

applying a pattern of adhesive dots to selected areas of one of a peel strip or a foil layer during fabrication of a seal for a medical container, and not applying the adhesive to a target area of the seal to form a non-adhesive target area, the adhesive dots being of uniform lateral size, uniformly spaced apart, and extending from a boundary of said non-adhesive target area to an edge of said substrate;

compressing the peel strip and the foil layer together to compress the pattern of adhesive dots therebetween to the extent that the adhesive dots transform into respective:

a) spaced-apart compressed dot bodies that are each individually visible with the naked eye during use by a user of the seal when applying the seal to a medical container, and b) a space around each compressed dot body that does not comprise part of the respective adhesive dot body, the space between the peripheral edge of each compressed dot body forms a visible lattice area that reflects light differently from the compressed dot bodies so that the lattice area surrounding the adhesive dots is visually distinguishable from and defines a boundary around the non-adhesive target area;

and using the lattice area formed in the selected adhesive-covered areas of the seal to visually distinguish from the non-adhesive target area which has no said lattice area.

18. The method of claim 17, further including using a clear adhesive for making said pattern of adhesive dots.

* * * * *